(12) United States Patent
Horlander et al.

(10) Patent No.: US 9,215,445 B2
(45) Date of Patent: Dec. 15, 2015

(54) BLOCK-BASED INTERLEAVING

(75) Inventors: Thomas Edward Horlander, Indianapolis, IN (US); Brian Joseph Dorini, Princeton, NJ (US)

(73) Assignee: THOMSON LICENSING, Issy les Moulineaux (FR)

( * ) Notice: Subject to any disclaimer, the term of this patent is extended or adjusted under 35 U.S.C. 154(b) by 564 days.

(21) Appl. No.: 13/575,803

(22) PCT Filed: Jan. 28, 2011

(86) PCT No.: PCT/US2011/000168
§ 371 (c)(1),
(2), (4) Date: Jul. 27, 2012

(87) PCT Pub. No.: WO2011/094019
PCT Pub. Date: Aug. 4, 2011

(65) Prior Publication Data
US 2012/0300843 A1    Nov. 29, 2012

Related U.S. Application Data

(60) Provisional application No. 61/337,060, filed on Jan. 29, 2010.

(51) Int. Cl.
*H04N 7/32* (2006.01)
*H04N 13/00* (2006.01)
(Continued)

(52) U.S. Cl.
CPC ....... *H04N 13/0048* (2013.01); *H04N 13/0059* (2013.01); *H04N 13/0062* (2013.01);
(Continued)

(58) Field of Classification Search
CPC .................................................. H04N 13/0048
USPC ...................................................... 375/240.12
See application file for complete search history.

(56) References Cited

U.S. PATENT DOCUMENTS

| 5,193,000 A | 3/1993 | Lipton et al. |
| 5,915,091 A | 6/1999 | Ludwig et al. |

(Continued)

FOREIGN PATENT DOCUMENTS

| DE | 19619598 | 11/1997 |
| EP | 1501318 | 1/2005 |

(Continued)

OTHER PUBLICATIONS

Hitachi Ltd., "Adaptive Picture Flipping Coding", Tomokazu Murakami, Hitachi, Ltd., July 26-Aug. 5, 2005, Working Party, 6 pages, Yokohama, Japan.

(Continued)

*Primary Examiner* — William C Vaughn, Jr.
*Assistant Examiner* — Luis Perez Fuentes
(74) *Attorney, Agent, or Firm* — Palak Bhakta; Vincent E. Duffy

(57) ABSTRACT

At least one implementation interleaves blocks from a stereo-image pair and enables intra-coding of the interleaved image using corresponding blocks as references. One particular implementation accesses a first image that includes multiple blocks, one of which is a first-image block. A second image is accessed that includes multiple blocks, one of which is a second-image block that has overlapping content with the first-image block. The multiple blocks of the first and second images are interleaved on a block basis to form an interleaved image. At least a portion of the interleaved image is encoded by encoding the first-image block using the second-image block as a reference. Another implementation provides the encoded portion in signal. Yet another implementation accesses the encoded image and decodes the portion by using the second-image block as a reference.

40 Claims, 7 Drawing Sheets

(51) Int. Cl.
*H04N 19/597* (2014.01)
*H04N 19/176* (2014.01)
*H04N 19/46* (2014.01)
*H04N 19/61* (2014.01)
*H04N 19/593* (2014.01)
*H04N 19/11* (2014.01)

(52) U.S. Cl.
CPC ............ *H04N19/11* (2014.11); *H04N 19/176* (2014.11); *H04N 19/46* (2014.11); *H04N 19/593* (2014.11); *H04N 19/597* (2014.11); *H04N 19/61* (2014.11)

(56) References Cited

U.S. PATENT DOCUMENTS

| | | | |
|---|---|---|---|
| 6,055,012 | A | 4/2000 | Haskell et al. |
| 6,157,396 | A | 12/2000 | Margulis et al. |
| 6,173,087 | B1 | 1/2001 | Kumar et al. |
| 6,223,183 | B1 | 4/2001 | Smith et al. |
| 6,390,980 | B1 | 5/2002 | Peterson et al. |
| 7,254,264 | B2 | 8/2007 | Naske |
| 7,254,265 | B2 | 8/2007 | Naske et al. |
| 7,321,374 | B2 | 1/2008 | Naske |
| 7,489,342 | B2 | 2/2009 | Xin et al. |
| 7,552,227 | B2 | 6/2009 | Wang |
| 8,102,920 | B2 * | 1/2012 | Suh .................. H04H 60/13 375/240.27 |
| 8,139,142 | B2 | 3/2012 | Bamji et al. |
| 8,259,162 | B2 | 9/2012 | Kim et al. |
| 8,471,893 | B2 * | 6/2013 | Kim .................. H04N 13/0066 348/42 |
| 8,885,721 | B2 * | 11/2014 | Tourapis .................. H04N 19/00 375/240.16 |
| 9,025,670 | B2 * | 5/2015 | Tourapis ............ H04N 13/0048 375/240.2 |
| 2004/0028288 | A1 | 2/2004 | Edgar |
| 2005/0117637 | A1 | 6/2005 | Routhier et al. |
| 2005/0134731 | A1 | 6/2005 | Lee et al. |
| 2005/0243920 | A1 | 11/2005 | Murakami et al. |
| 2006/0176318 | A1 | 8/2006 | Martin et al. |
| 2006/0222254 | A1 | 10/2006 | Zandi et al. |
| 2006/0262856 | A1 | 11/2006 | Wu et al. |
| 2007/0014360 | A1 * | 1/2007 | Botzko .............. H04N 21/2383 375/240.16 |
| 2007/0030356 | A1 | 2/2007 | Yea et al. |
| 2007/0041633 | A1 | 2/2007 | Bhaskaran et al. |
| 2007/0121722 | A1 | 5/2007 | Martinian et al. |
| 2007/0153838 | A1 | 7/2007 | Pons et al. |
| 2007/0177813 | A1 | 8/2007 | Yang |
| 2007/0205367 | A1 | 9/2007 | Deman et al. |
| 2007/0211796 | A1 | 9/2007 | Kim |
| 2007/0229653 | A1 | 10/2007 | Matusik et al. |
| 2007/0269136 | A1 | 11/2007 | Naske |
| 2008/0152241 | A1 | 6/2008 | Itoi |
| 2008/0199091 | A1 | 8/2008 | Srinivasan et al. |
| 2008/0284763 | A1 | 11/2008 | Someya et al. |
| 2008/0303895 | A1 | 12/2008 | Akka et al. |
| 2009/0002481 | A1 * | 1/2009 | Kim et al. .................. 348/42 |
| 2009/0092311 | A1 | 4/2009 | Kim et al. |
| 2009/0103616 | A1 | 4/2009 | Ho et al. |
| 2009/0110007 | A1 | 4/2009 | Li |
| 2009/0195640 | A1 | 8/2009 | Kim |
| 2009/0219282 | A1 | 9/2009 | Kim et al. |
| 2010/0026712 | A1 | 2/2010 | Aliprandi et al. |
| 2010/0091881 | A1 | 4/2010 | Pandit et al. |
| 2010/0310155 | A1 | 12/2010 | Newton et al. |
| 2011/0170792 | A1 * | 7/2011 | Tourapis .............. H04N 13/004 382/236 |

FOREIGN PATENT DOCUMENTS

| | | |
|---|---|---|
| EP | 1581003 | 9/2005 |
| EP | 1667448 | 6/2006 |
| EP | 1729521 | 12/2006 |
| EP | 2096870 | 9/2009 |
| EP | 2197217 | 6/2010 |
| JP | 2004048293 | 2/2004 |
| JP | 2007159111 | 6/2007 |
| JP | 2008034892 | 2/2008 |
| JP | 2009034892 | 2/2008 |
| JP | 2009182953 | 8/2013 |
| KR | 2005055163 | 6/2005 |
| KR | 100535147 | 12/2005 |
| KR | 1020090102116 | 9/2009 |
| RU | 2006101400 | 6/2006 |
| RU | 2007103160 | 8/2008 |
| WO | WO9743863 | 11/1997 |
| WO | WO9802844 | 1/1998 |
| WO | WO0225420 | 3/2002 |
| WO | WO2006001653 | 1/2006 |
| WO | WO2006041261 | 4/2006 |
| WO | WO2006137006 | 12/2006 |
| WO | WO2007046957 | 4/2007 |
| WO | WO2007047736 | 4/2007 |
| WO | WO2007081926 | 7/2007 |
| WO | WO2007126508 | 11/2007 |
| WO | WO2008024345 | 2/2008 |
| WO | WO2008127676 | 10/2008 |
| WO | WO2008140190 | 11/2008 |
| WO | WO2008150111 | 12/2008 |
| WO | WO2008156318 | 12/2008 |
| WO | WO2009040701 | 4/2009 |
| WO | WO2010011557 | 1/2010 |

OTHER PUBLICATIONS

Costello, "Exit Orientation Tag (Feb. 17, 2002)", Internet article: http://web.archive.org/web/20022071400417/http://syfvana.net/jpegcrop/exif_orientation.html.

Li et al., "A Novel Multi-View Video Coding Scheme Based on H.264", ICICS-PCM 2003, IC2.8, IEEE, Dec. 15-18, 2003, pp. 493-497, Singapore.

De Bruyne et al., "Enhanced Shot-Based Video Adaptation Using MPEG-21 Generrtic Bitstream Syntax Schema", Proc. of 2007 IEEE Symposium (CIISP 2007) IEEE, pp. 380-385.

Vetro, "Frame Compatible Formats for 3D Video Distribution", Mitsubishi Electric Laboratories, Inc., TR2010-099, Nov. 2010, Cambridge, Massachusetts.

Vetro et al., "Joint Draft 2.0 on Multiview Vieo Coding", JVT of ISO/IEC MPEG & ITU-T VCEG, Document: JVT-V209, 22nd Meeting: Jan. 13-19, 2007, 28 pages, Marrakech, Morocco.

De Neve et al., "Using Bitstream Structure Descriptions for the Exploitation of Multi-Layered Temporal Scalability in H.264/AVC's Base Specification", PCM 2005, Pt. 1, LNCS 3767 Heidelberg.

Martinian et al., "View Synthesis for Multiview Video Compression", Mitsubishi Electric Research Laboratories, TR2006-035, May 2006, 8 pages, Cambridge, Massachusetts.

Meessen et al., "Content Browsing and Semantic Context Viewing Through JPEG 2000-Based Scalable Video Summary," IEE Proceedings of Visual Image Signal Processing, vol. 153, No. 3, Jun. 2006, pp. 274-283.

Martinian et al., "Extensions of H.264/AVC for Multiview Video Compression", 2006 IEEE International Conference on Image Processing, Oct. 8, 2006, pp. 2981-2984.

Wimmer, "Stereoscopic Metadata Format Specification," Version 1.3, pp. 1-9, http:www.3dtv/atpffoce@3dtv.at, Linz, Austria, Jul. 8, 2006.

Wimmer, "Stereoscopic Player and Stereomultiplexer," a Computer-Based System for Stereoscopic Video Playback and Recording, Johannes Kepler University, Linz, Austria, pp. 1-9, Nov. 27-28, 2006.

Pandit et al., "High Level Syntax changes for MVC", Joint Video Team (JVT) of ISO/IEC MPEG & ITU-T VCEG (ISO/IEC JTC1/SC29/WG11 and ITU-T SG16 Q.6), 22nd Mtg., Marrkech, Morocco, Jan. 13-19, 2006, Doc.: JVT-V054, p. 1-10.

Technical Standardization Committee on AV & IT Storage Systems and Equipment: Japan Electronics and Information Technologies Industries Assn: Exchangeable Image File Format for Digital Still Cameras: Exif Version 2.2, Apr. 2002, pp. 1-18.

(56) References Cited

OTHER PUBLICATIONS

Wimmer, "DV/HDV Tape Drive Synchronization" Steroscopic Displays and Appllications Conference, Jan. 29-31, 2007, San Jose, CA, pp. 1-20.

Tian et al., "On 2D + Depth SEI Message", International Organisation for Standardisation, ISO/IEC JTC1/SC29/WG11, MPEG 2009/M16320, Maui, US, Apr. 2009.

International Telecommunication Union, Reply LS from ISO/IEC JTC 1/SC29/WG 11 on Video Coding Activities (COM16-LS-38), Study Group 16, Geneva, Oct. 26-Nov. 6, 2009, 2 pages.

Sullivan et al., "Coding of Moving Pictures and Audio Information", International Organisation for Standardisation, ISO/IEC JTC1/SC29/WG11N 10540, Maui, US, Apr. 2009.

Tourapis et al., "JVT of ISO/IEC MPEG & ITU-T VCEG, Format Extensions to the Spatially Interleaved Pictures SEI Message", Document: JVT-AD022, Geneva, CH, Jan. 29-Feb. 3, 2009.

Yamakage et al., "Generalized SEI Message for Spatially Interleaved Pictures", JVT of ISO/IEc MPEG & ITU-T VCEG, Document: JVT-AD012, Geneva, CH, Jan. 29-Feb. 3, 2009, pp. 1-6.

Tian et al., "On Spatially Interleaved Pictures SEI Message", JVT of ISO/IEC MPEG & ITU-T VCEG, Document: JVT-AD017, Geneva, CH, Jan. 29-Feb. 3, 2009, pp. 1-11.

HDMI Licensing, LLC, "3D Portion of the HDMI Specification Version 1.4", Press Release Jan. 26, 2011, 2 pages.

Fehn et al. "An Evolutionary and Optimised Approach on 3D-TV", 2003, pp. 1-8.

Standard of Japan Electronics and Information Technology Industries Association, "Exchangeable Image File Format for Digital Still Cameras: Exif Version 2.2," Technical Standardization Committee on AV & IT Storage Systems and Equipment, JEITA CP-3451, Apr. 2002.

Drose et al., "Extending Single View Scalable Video Coding to Multiview Based on H.264/AVC," IEEE International Conference on Image Processing, Oct. 8-11, 2006, Atlanta, Georgia, 4 pages.

HDMI Licensing, LLC, "FAQ for HDMI 1.4", Feb. 18, 2011, pages 1-6.

Pandit et al., "H.264/AVC Extension for MVC Using SEI Message", JVT of ISO/IEC MPEG & ITU-T VCEG, Document: JVT-X061, 24th Meeting: Geneva, Switzerland, Jun. 29-Jul. 6, 2007, pages 1-14.

International Standard ISO/IEC 23002-3, "Information Technology—MPEG Video Technologies—Part 3: Representation of Auxiliary Video and Supplemental Information", First Edition Oct. 15, 2007, 34 pages.

Venuti, "Introducing HDMI 1.4 Specification Features", High Definition Multimedia Interface, HDMI Licensing, LLC, 2009, pp. 1-33.

Dickson, "NAB 2010: Grass Valley Unveils New Ignite Automation Product," Broadcasting and Cable, Apr. 12, 2010, 1 page.

Bruls et al., "Proposal to Amendment MPEG-C Part 3", International Organsiation for Standardisation, Coding of Moving Pictures and Audio, ISO/IEC JTC1/SC29/WG11, MPEG2007/M14700, Lausanne, Jul. 2007, 7 pages.

Yan et al., "Region-Based Compression of Remote Sensing Stereo Image Pairs", Proceedings of SPIE, vol. 7455, 2009, pp. 1-13.

Wimmer, "Stereoscopic Movie Disk, 3DTV" Two Posters, Johannes Kepler University, Linz, Austria, Nov. 27-28, 2006.

Fehn et al., "Study of Some MPEG Tools Related to 3D-Video, International Organisation for Standardisation, Coding of Moving Pictures and Associated Audio Information", ISO/IEC JTC1/SC29/WG11, MPEG02/M8423, Fairfax, May 2002, 6 pages.

Motorola, "3D Cinecast: A Curation About New Media Technologies," Overview of MPEG Standards for 3DTV, Apr. 21, 2010.

Motorola, "Overiview of MPEG Standards for 3DTV", White Paper, 2010, 4 pages.

Constrained Baseline profile and supplemental enhancement informationJVT of ISO/IEC MPEG & ITU-T VCEG, 29th Meeting, Busan, KR, Oct. 12-17, 2008.

Wimmer, "3dtv.at—Stereoscopic Player and Stereoscopic Multiplexer—S3D-Today," http://www.3dtv.at, Nov. 27-28, 2006, Munich, Germany, pp. 1-21.

Wimmer, "3dtv.at—Stereoscopic Movie Disk—S3D-Today," http://www.3dtv.at, Nov. 27-29, 2007, Munich, Germany, pp. 1-12.

Wimmer, "3dtv.at—DV/HDV Tape Drive Synchronization," Stereoscopic Displays and Applications Conference, Jan. 29-31, 2007, San Jose, US, pp. 1-20, http://www.3dtv.at.

Wimmer, "Aufahme and Wiedergabe Stereokopischer Videos im Anwendungsbereich der Telkooperation," Linz, Austria, pp. 1-12, May 2004.

"Chapter 13, MVC in H.264/AVC (Multiview Video Coding)Standard", Revised 3rd Ed. H.264AVC Textbook, pp. 305-323, Jan. 2009.

US 7,539,250, 05/2009, Routhier et al. (withdrawn)

\* cited by examiner

BLOCK-BASED INTERLEAVING

CROSS-REFERENCE TO RELATED APPLICATIONS

This application claims the benefit, under 35 U.S.C. §365 of International Application PCT/US2011/000168, filed Jan. 28, 2011, which was published in accordance with PCT Article 21(2) on Aug. 4, 2011, in English and which claims the benefit of U.S. provisional patent application No. 61/337,060, filed Jan. 29, 2010.

TECHNICAL FIELD

Implementations are described that relate to image compression. Various particular implementations relate to compression of interleaved images, and the interleaved images may be formed of images having overlapping content.

BACKGROUND

Various techniques are known to compress images, including stereoscopic images and multi-view images. AVC, which refers to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard", the "H.264 standard", or simply "AVC" or "H.264"), may be used to compress such images individually. "I" frames are typically compressed in AVC using intra-coding techniques.

SUMMARY

According to a general aspect, a first image that includes multiple blocks is accessed. The multiple blocks of the first image include a first-image block. A second image that includes multiple blocks is accessed. The multiple blocks of the second image include a second-image block that has overlapping content with the first-image block. The multiple blocks of the first image and the multiple blocks of the second image are interleaved on a block basis to form an interleaved image. At least a portion of the interleaved image is encoded by encoding the first-image block using the second-image block as a reference. The encoded first-image block is provided for transmission or storage.

According to another general aspect, a video signal or a video signal structure includes one or more picture portions for an encoding. The encoding is an encoding of a block-based interleaving of multiple blocks of a first image and multiple blocks of a second image. The multiple blocks of the first image include a first-image block, and the multiple blocks of the second image include a second-image block that has overlapping content with the first-image block. The encoding of the first-image block uses the second-image block as a reference.

According to another general aspect, an encoded image is accessed. The encoded image is an encoding of a block-based interleaving of multiple blocks of a first image and multiple blocks of a second image. The multiple blocks of the first image include a first-image block, and the multiple blocks of the second image include a second-image block that has overlapping content with the first-image block. A portion of the encoded image is decoded. The encoded image portion encodes the first-image block using the second-image block as a reference. The decoded portion is provided for processing or display.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

At least one implementation described in this application seeks to improve the efficiency of compressing a stereo image pairs that has been merged into a single image. The implementation rearranges the stereo image pair in a way that allows the H.264 compression algorithm to take better advantage of intra block prediction. The left view and right view pictures of the stereo image pair are interleaved at the macroblock level. The left view and right view pictures are encoded together as a single picture, and the interleaved picture arrangement typically improves intra prediction efficiency versus typical horizontal or vertical split screen arrangements.

In block based compression algorithms (for example MPEG2, MPEG4), the inventors have determined that a disproportionate percentage of the total bit budget allocated to a compressed stream are spent on I-picture compression. Note that I pictures are often used as reference pictures. In the near term, broadcast 3D video is likely to rely on a split screen approach to deliver a left/right stereo image pair. A typical arrangement is a left and right picture, each horizontally sub-sampled by half, concatenated to form a single full size composite left+right picture.

Horizontal sub-sampling and vertical sub-sampling are both used in current generation half resolution 3D encoders. Typically, horizontal sub-sampling is used for 1920×1080 source material, and vertical sub-sampling is used for 1280×720 p source material.

The advantage of these sub-sampling approaches is that the composite picture can be encoded and decoded by legacy equipment with the display device responsible for separating the left and right images. While convenient, this approach does not take good advantage of the redundancy between the left and right images. By rearranging the left and right images in a way that allows the compression algorithm to take better advantage of this redundancy, the resulting compressed image stream can still remain largely compatible with legacy encode/decode tools while increasing the compression efficiency of the coded I (or reference) pictures.

The above approach can be used as an alternative to MVC (multi-view coding). Although alternatives, the above approach and MVC are not necessarily equivalent in that the two approaches may produce different results. MVC refers more specifically to a multi-view video coding ("MVC") extension (Annex H) of the AVC standard, referred to as H.264/MPEG-4 AVC, MVC extension (the "MVC extension" or simply "MVC"). MVC is non-backward compatible compression algorithm, which is an extension of the H.264/MPEG-4 AVC standard that has been developed to take advantage of, for example, the redundancy between left and right views in a stereo image pair.

Figure 1:
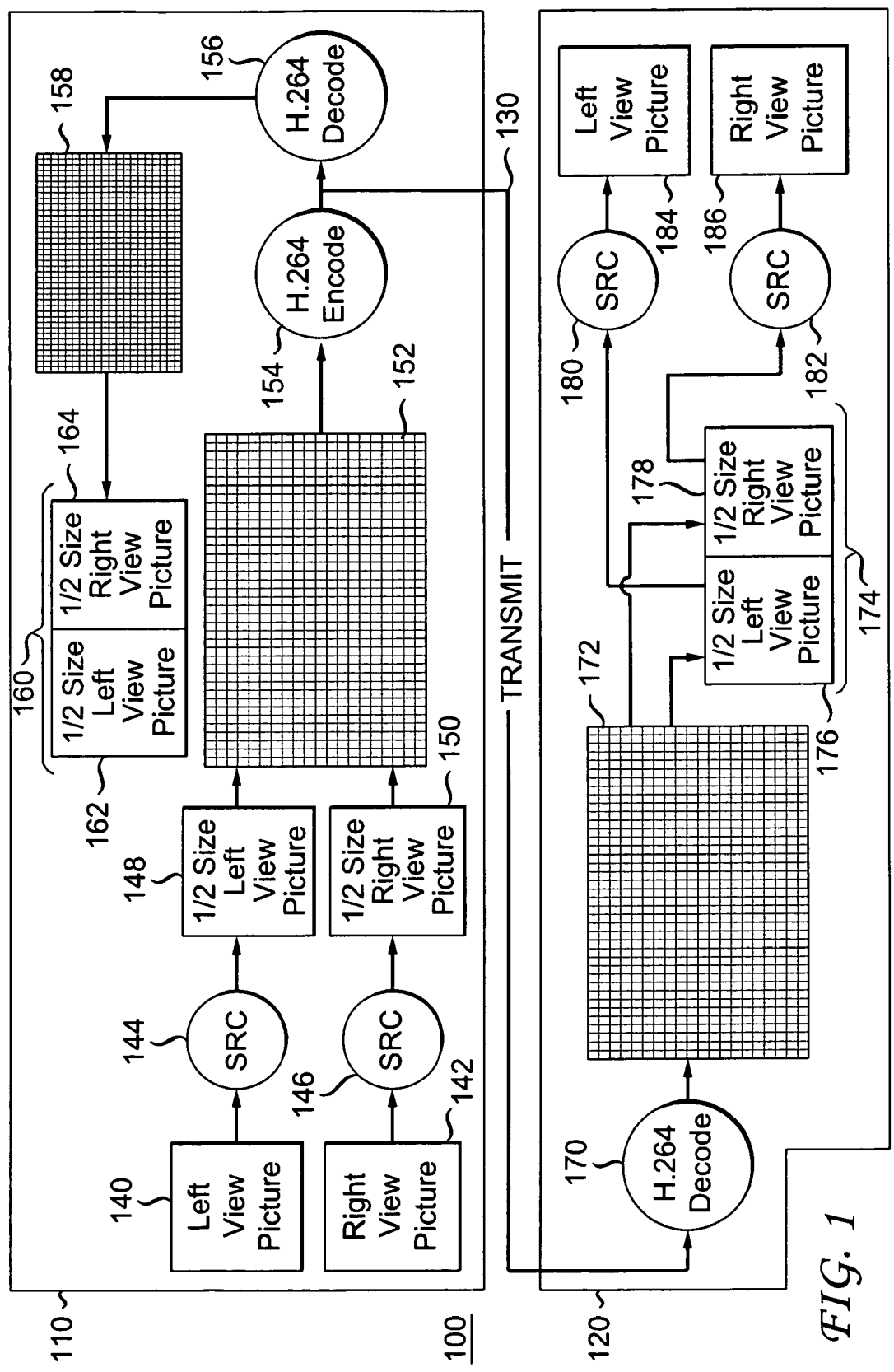
FIG. 1 is a block/flow diagram depicting an example of a system and process for encoding and decoding images that may be used with one or more implementations.

Referring to FIG. 1, a system 100 is shown that provides an implementation for processing intra coded pictures (that is, I pictures). Intra coded pictures follow the process illustrated in FIG. 1, and described below. The system 100 includes an encoding block 110, a decoding block 120, and a transmission operation 130 that links the encoding block 110 and the decoding block 120.

Full resolution input pictures for a stereo-image pair are provided as input to the encoding block 110. The full resolution stereo images include a left view picture 140 and a right view picture 142. The full resolution images are down-sampled in the horizontal dimension by ½ to reduce the original horizontal size by ½. This results in a horizontal sample rate conversion ("SRC") to ½ the original horizontal size. Down-sampling is also referred to as sub-sampling, rate converting, or down-scaling. The encoding block 110 includes a sampler 144 that down-samples the left view picture 140, and a sampler 146 that down-samples the right view picture 142. The sampler 144 produces a sampled left view picture 148 that is ½ the size of the left view picture 140 in the horizontal dimension. Similarly, the sampler 146 produces a sampled right view picture 150 that is ½ the size of the right view picture 142 in the horizontal dimension.

The sampled left view picture 148 and the sampled right view picture 150 are interleaved to form an interleaved composite picture 152. The composite picture 152 is formed by decomposing (also referred to as partitioning or dividing) the sampled left view picture 148 into 16×16 macroblocks, decomposing the sampled right view picture 150 into 16×16 macroblocks, and interleaving the macroblocks from the left view picture 148 and the right view picture 150 to form the composite picture 152.

In the implementation shown in FIG. 1, the macroblocks are interleaved on an alternating basis in a column-by-column format, as explained further with respect to FIG. 4 below. This results in a composite picture 152 that has the same vertical dimension as the sampled left view picture 148 and the sampled right view picture 150, and twice the horizontal dimension of either of the sampled left view picture 148 and the sampled right view picture 150.

The encoding block 110 includes an H.264 encoder 154 that encodes the composite picture 152. In the encoding block 110, the composite picture 152 is encoded using HP@L4.x to form an encoded picture (not shown). HP@L4.x refers to High Profile, level 4.x, which includes 4.0, 4.1, and 4.2. However, other implementations use any of several of the H.264 coding profiles, such as, for example, all levels of the Baseline Profile, all levels of the Main Profile, and all levels of the High Profile.

Figure 2:
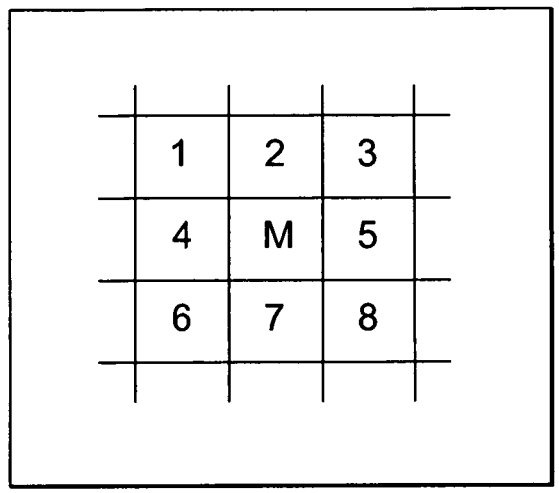
FIG. 2 is a block diagram depicting examples of neighboring blocks that may be used with one or more implementations.

The encoder 154 encodes the composite picture 152 as an I picture, and uses H.264 intra-coding modes. Accordingly, the blocks of the composite picture 152 are encoded using one or more other blocks from the composite picture 152 as a reference. For example, a predictor for a given block may be formed from a combination of neighboring blocks. A neighboring block of a given block is commonly defined to be one of the eight blocks that touches the given block on a corner or edge. Referring to FIG. 2, the eight neighboring blocks of a middle block M are shown as blocks 1-8. Note that for purposes of H.264 Intra prediction modes, blocks 1,2,3,4 and 6 are generally allowed as predictors.

Figure 3:
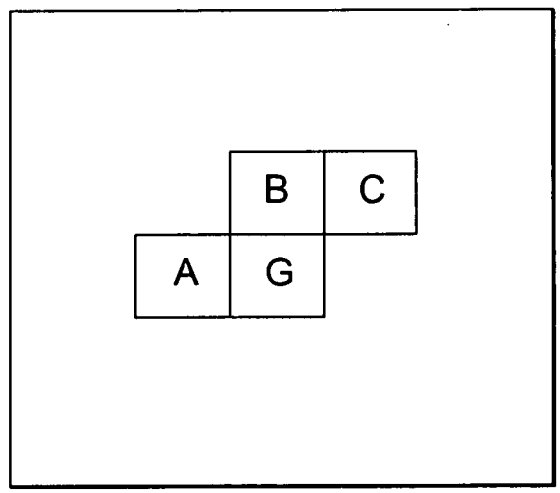
FIG. 3 is a block diagram depicting examples of neighboring reference blocks that may be used with one or more implementations.

Referring to FIG. 3, various implementations form the predictor for a given block (block G) from a combination of blocks lying horizontally to the left (block A), vertically above (block B), and diagonally to the right and above (block C). Because the composite picture 152 uses column-by-column interleaving, it should be clear that block G will be from one of either the sampled left view picture 148 or the sampled right view picture 150, and that blocks A and C will both be from the other sampled picture. Various implementations may form a predictor based on only one (rather than a combination) of blocks A, B, or C, or on other blocks including non-neighboring blocks. In particular, various implementations provide encoding modes that allow block G to be encoded with respect to block A alone, or with respect to block C alone.

Such modes, that code block G using only block A or block C, are expected to have increased coding efficiency by using the interleaved composite picture 152, as compared to using a split screen format that is not interleaved (see horizontal split screen picture 160 described below). The increased efficiency is expected to arise, at least in part, from being able to encode a block from one view (left or right) using a corresponding block from the other view. If the corresponding blocks are aligned well, then the residue will be small and will require fewer bits to encode. It is noted, however, that the alignment need not be perfect to reduce the residue and provide coding gains.

As noted above, blocks 1,2,3,4, and 6 as shown in FIG. 2 may be used as predictors for block M in H.264 Intra prediction. Various implementations, however, perform interleaving to take advantage of the fact that in a stereoscopic view there is expected to be horizontal displacement in the two pictures but not vertical displacement. The best predictor in such cases is expected to be to the corresponding block from the other stereoscopic view. That corresponding block will often be to the left of the block being coded after column-wise interleaving, and will often be above the block being coded after row-wise interleaving.

Various implementations perform intra-coding of the composite picture 152 by searching within the composite picture 152 for the best reference block. More specifically, several such implementations search within a reconstruction of those portions of the current picture that have already been encoded. Because of the searching, such a mode is often more time-intensive and processor-intensive than merely using predetermined neighboring blocks as the references. However, such a mode typically offers the advantage of finding a better prediction of a given block. Such a mode also typically offers the advantage of finding a corresponding stereo-image block without needing to know the disparity.

The encoding block 110 includes an H.264 decoder 156 that decodes the encoded picture to produce a decoded picture 158. In the implementation of the encoding block 110, the encoded picture is decoded using HP@L4.x. The decoded picture 158 is a reconstruction of the composite picture 152.

The encoding block 110 deinterleaves the decoded picture 158 to form a horizontal split screen picture 160. The horizontal split screen picture 160 includes a left picture reconstruction 162 of the sampled left view picture 148, and includes a right picture reconstruction 164 of the sampled right view picture 150. The horizontal split screen picture 160 is stored as a reference picture in a reference picture storage (not shown), and is available to be used as a reference picture by the encoding block 110.

P and B pictures are coded as horizontal split screen pictures. That is, for P and B pictures, the sampled left view picture 148 and the sampled right view picture 150 are formed into a horizontal split screen picture rather than an interleaved composite picture, and encoded by the encoder 154. Reference pictures are also stored as horizontal split screen pictures, as indicated above. When P or B coded blocks contain motion references that point to the I picture, the motion estimation is extracted from the horizontal split screen reconstructed picture 160.

The encoding block 110 thus performs different operations for I blocks, as compared to P and B blocks. For example, for I blocks the encoding block 110 performs (i) interleaving before encoding and (ii) deinterleaving before forming a horizontal split screen reconstruction picture. As another example, for P and B blocks, the encoding block 110 forms a split screen picture before encoding.

The encoder 154 also provides the encoded picture (not shown) to the transmission operation 130 for transmission. The transmitted picture is received by the decoding block 120.

The decoding block 120 includes an H.264 decoder 170 that performs an HP@L4.x decode of the received picture. The decoder 170 produces a reconstructed picture 172 that is a reconstruction of the composite picture 152. Accordingly, the reconstructed picture 172 has macroblocks interleaved from a left image (the sampled left view picture 148) and a right image (the sampled right view picture 150). In a typical implementation, the decoder 170 will be the same as the decoder 156.

The decoding block 120 deinterleaves the reconstructed picture 172 to form a horizontal split screen picture 174 that includes a left picture reconstruction 176 and a right picture reconstruction 178. If there are no errors in transmission or decoding, (i) the reconstructed picture 172 will match the decoded picture 158 from the encoding block 110, (ii) the horizontal split screen picture 174 will match the horizontal split screen picture 160, (iii) the left picture reconstruction 176 will match the left picture reconstruction 162, and (iv) the right picture reconstruction 178 will match the right picture reconstruction 164.

The decoding block 120 includes a sampler 180 that performs horizontal sample rate conversion to recover the original horizontal size. The sampler 180 performs the conversion by upsampling the left picture reconstruction 176 to recover the original horizontal size of the left view picture 140. The sampler 180 produces a reconstructed left view picture 184 which is a reconstruction of the left view picture 140. Upsampling is also referred to as rate converting or up-scaling.

Similarly, the decoding block 120 includes a sampler 182 that performs horizontal sample rate conversion to recover the original horizontal size. The sampler 182 performs the conversion by upsampling the right picture reconstruction 178 to recover the original horizontal size of the right view picture 142. The sampler 182 produces a reconstructed right view picture 186 which is a reconstruction of the right view picture 142.

The reconstructed left view picture 184, and the reconstructed right view picture 186 are full resolution pictures ready for output to display. Other implementations also, or alternatively, provide the reconstructed left view picture 184 and/or the reconstructed right view picture 186 for processing. Such processing includes, for example, filtering, rendering further images, artifact reduction, color modification, edge sharpening, and/or object detection, and may be performed prior to display or in lieu of display. Additionally, other implementations provide the horizontal split screen picture 174 as output for processing and/or display.

As with the encoding block 110, the decoding block 120 also performs different operations for I blocks, as compared to P and B blocks. For example, for I blocks the decoding block 120 performs deinterleaving before forming the horizontal split screen picture 174. In contrast, for P and B blocks, the output of the decoder 170 will be a horizontal split screen picture.

The process of FIG. 1 is at least largely backward compatible with existing processes. Additionally, legacy H.264 encoders and decoders may be used. However, the process of FIG. 1 may not be completely backward compatible with all existing decode processes. Nonetheless, it is within the capability of many decoders to use integrated Blit (for example, a programmable bitmap graphics device; or a bit blit device performing bit-block image transfers, for example, to combine multiple bitmaps) or DMA capability to convert the macroblock interleaved I picture image into a left/right split screen image. That is, an existing H.264 decoder might not be configured to convert the decoded (interleaved picture) 158 into the horizontal split screen picture 160, or to convert the reconstructed picture 172 into the horizontal split screen picture 174. However, techniques for performing this conversion are viable and well within the ordinary skill in the art using, for example, technologies such as integrated Blit or DMA. Additionally, such technologies can be used to selectively create either an interleaved image (for example, the composite picture 152) or a split screen concatenated image to be used as input to an H.264 encoder.

Other implementations modify various aspects of the system 100 described above. Certain implementations and modifications are described below, but other modifications are contemplated as well.

- For example, the two input images need not form a stereo-image pair. In various implementations, the input images are images from a multi-view system.
- Additionally, the input images need not be downsampled by exactly ½, and need not be downsampled at all. In various implementations, the input images (i) remain at their original sampling rate, (ii) are downsampled by values other than ½, or (iii) are upsampled.

Further, the input images need not be sampled at the same rate. In various implementations, a first input image is sampled at a first rate and a second input image is sampled at a second rate that is different from the first rate.

Implementations may use more than two input images. Various implementations use three or more input images, and interleave all of the input images. One such implementation interleaves three or more input views from a multi-view system. Another such implementation interleaves four images that include a first stereo image pair taken from a stereo camera at a first instant of time and a second stereo image pair taken from the stereo camera at a second instant of time.

Various implementations process the input images in addition to, or in lieu of, sampling the input images. Processing performed by various implementations includes, for example, filtering the pixel values of the images, clipping the pixel values of the images, adding blocks to the images around the image borders, or removing blocks that do not have overlapping content.

The blocks used for interleaving need not be 16×16, nor even macroblocks. Various implementations use blocks having a size different from 16×16 and/or use a block size different from the size of macroblocks used in encoding. Various implementations also vary the block size or use a selectable block size. The H.264 standard allows intra prediction for 4×4 blocks, 8×8 blocks, and 16×16 macroblocks. An above implementation illustrates and describes the concept using macroblocks, but other implementations implement the interleaving at the block level, including, for example, a 4×4 block level, an 8×8 block level, and a variable level that uses both 4×4 blocks and 8×8 blocks.

The interleaved image need not be encoded using HP@L4.x, nor even H.264. Various implementations use different H.264 profiles or different coding schemes. For example, for H.264 all levels of the High Profile, all levels of the Main Profile, and all levels of the Baseline Profile may be used, and various implementations are directed to each of these levels and Profiles.

The encoded interleaved image provided by the encoding block 110 need not be transmitted. Various implementations store the encoded image, for example.

The reference images need not be horizontal split screen images, or even split screen images at all. Various implementations use, for example, vertical split screen images as references, or interleaved images as references, or the individual images as references.

P and B pictures need not be coded as horizontal split screen pictures. Various implementations perform interleaving of P and/or B stereoscopic image pairs, as is done above for I pictures. One or more of these implementations codes the interleaved P and/or B pictures using inter-coding with respect to other pictures used as references. The references for several such implementations are also interleaved pictures, but for other implementations the references are not interleaved. Additionally, some of these implementations consider both inter-prediction modes and intra-prediction modes for coding a given block in the interleaved P or B picture. As such, some of these implementations perform an optimal encoding of the given block from the interleaved P or B picture.

Figure 4:
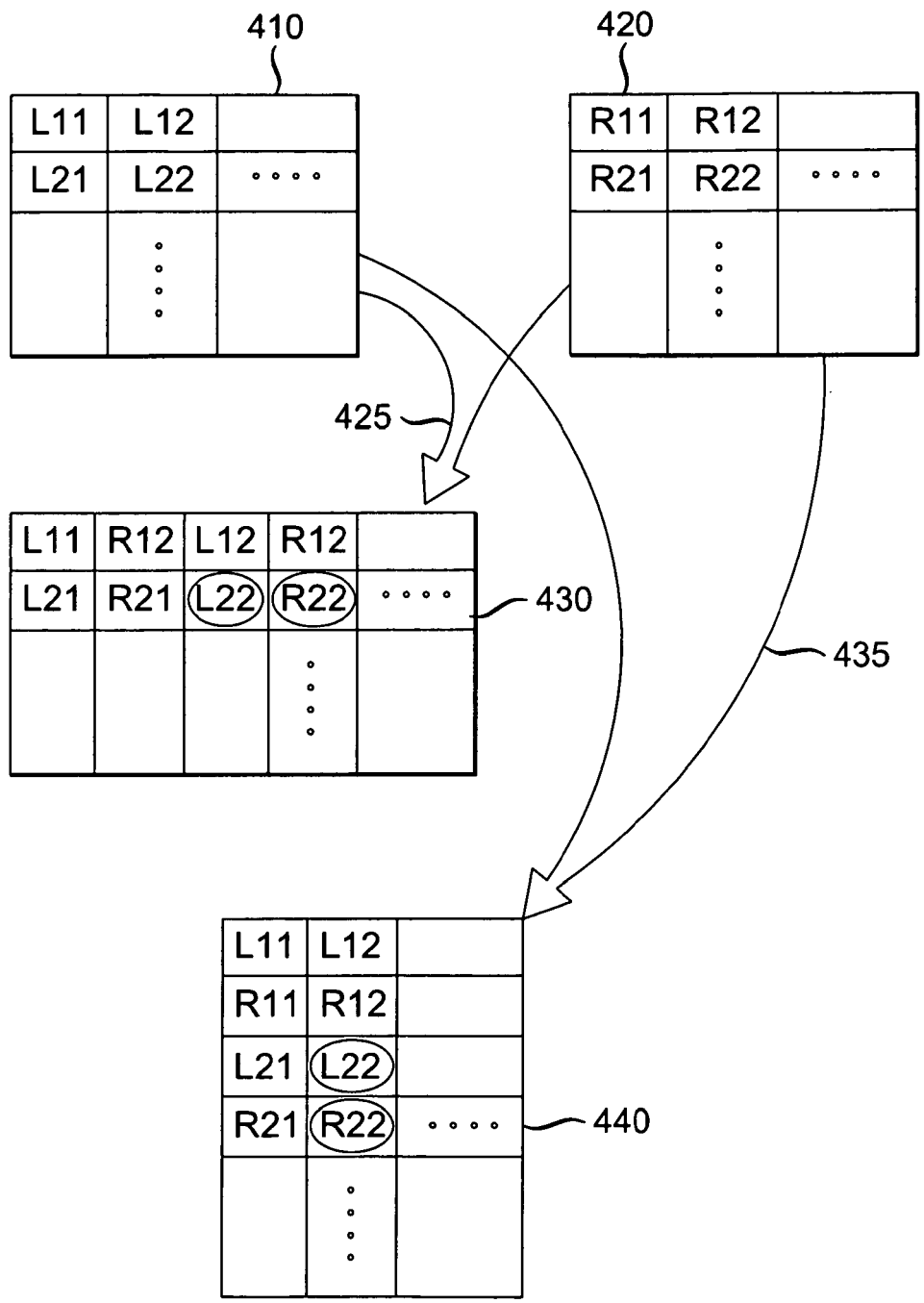
FIG. 4 is a block/flow diagram depicting examples of vertical interleaving and horizontal interleaving that may be used with one or more implementations.

Referring to FIG. 4, there is shown a more detailed view of two implementations of macroblock level interleaving. FIG. 4 depicts a left picture 410 and a right picture 420 of a stereo-image pair. In this implementation, the left picture 410 and the right picture 420 are assumed to have been down-sampled in the horizontal direction by a factor of 2. These two pictures 410 and 420 are combined, as shown by arrow 425, to form an interleaved picture 430. The interleaved picture 430 is effectively a column-wise interleaving of the pictures 410 and 420.

For this implementation, it is assumed that an encoder encodes the interleaved picture 430 row-by-row, from left to right. Accordingly, as the encoder is encoding the interleaved picture 430, it can be seen that when the encoder gets to the block labeled R22 (circled in the interleaved picture 430), the encoder has already encoded the corresponding block L22 (also circled in the interleaved picture 430) from the left picture, and has the encoding of L22 available to use in encoding R22. L22 is to the immediate left of R22 in the interleaved picture 430.

L22 and R22 correspond as corresponding blocks in a stereo-image pair, and so their content is assumed to overlap considerably. Content overlaps when both blocks have some common content. Blocks share common content when, for example, both blocks include a particular object or background, even if that object or background is not in exactly the same relative position in each of the blocks.

Identification of these corresponding blocks is based simply on the fact that L22 and R22 have corresponding locations in the two pictures 410 and 420. That is, L22 and R22 are assumed to have the same (x,y) coordinates in their respective pictures 410 and 420.

Other implementations determine corresponding blocks based on, for example, disparity. For such disparity-based implementations, a variety of disparity-based metrics may be used, such as, for example, the average disparity for the stereo-image pair. In one such implementation, the average disparity of the picture 410 is determined to be equal to the horizontal size of a single block. Accordingly, the block L12 of the picture 410 is determined to correspond to the block R11 of the picture 420. Note that in such an implementation, the interleaving may still be performed as in the interleaved picture 430, or the interleaving may be based on the disparity.

In one disparity-based implementation, the blocks are interleaved as in the interleaved picture 430. However, corresponding blocks may or may not be neighbors. In the example in which L12 corresponds to R11, those blocks would still be neighbors, as shown in the interleaved picture 430. However, if the disparity were equal to twice the horizontal size of the blocks, then L13 would correspond to R11, and those blocks would not be neighbors in the interleaved picture 430.

In another disparity-based implementation, the blocks are interleaved based on the disparity. Therefore, if L13 corresponds to R11, then those blocks are interleaved so that they are neighbors. In one such implementation, the first two columns of the picture 410 are inserted directly into the interleaved picture, then the remaining columns of the picture 410 are column-interleaved with columns from the picture 420. Finally, the last remaining columns of the picture 420 are inserted directly into the interleaved picture.

In various implementations, the correspondence between blocks is not perfect. That is, the common content is not in the same relative position in each of the corresponding blocks. For example, the disparity is not equal to the horizontal size of the blocks. Nonetheless, coding gains are still achieved.

In other disparity-based implementations, blocks from the various input images are interleaved based on their relative locations in the input images. For example, the first column of the picture 410 is followed by the first column of the picture 420. However, an individual block of the interleaved picture is intra-coded by searching within the interleaved picture to find a good reference. Such a search may identify the corresponding block without the implementation knowing the disparity prior to the search.

Other downsampling and interleaving options are possible. Referring still to FIG. 4, an implementation is shown in which the left picture 410 and the right picture 420 are assumed to have been downsampled in the vertical direction by a factor of 2, rather than in the horizontal direction as previously described in the discussion of FIG. 4 above. Further, the vertically-downsampled pictures 410 and 420 are then interleaved row-wise to form an interleaved picture 440 as shown by an arrow 435. As with the encoding of the interleaved picture 430, it can be seen that when the encoder gets to the block labeled R22 (circled in the interleaved picture 440), the encoder has already encoded the corresponding block L22 (also circled in the interleaved picture 440) from the left picture, and has the encoding of L22 available to use in encoding R22. L22 is immediately above R22 in the interleaved picture 440.

In yet another implementation, the left and right pictures are downsampled in a combination of horizontal and vertical directions to reduce their sizes by a combined factor of 2. As will be appreciated by those of ordinary skill in the art, various combinations of downsampling in the horizontal and vertical directions are possible in order to achieve a combined factor of 2 reduction. These downsampled pictures may then be interleaved in various manners known to those of ordinary skill in the art, including a combination of row-wise and column-wise interleaving.

Another implementation does not downsample at all, and the pictures 410 and 420 are assumed to be in their original sizes. This implementation simply combines the left and right pictures using any of various interleaving options known in the art to produce a large interleaved picture. The H.264 encoder then encodes this large interleaved picture.

In a typical implementation of either interleaving option of FIG. 4, an encoder and a decoder de-interleave the interleaved pictures 430 and 440 to form a reconstruction of a typical left/right horizontal split screen view, such as that provided by the horizontal split screen picture 174 of FIG. 1. However, in other implementations, the encoder and decoder do not perform this operation. Rather, the encoder and decoder simply produce a reconstructed interleaved picture that still has the left and right views interleaved. The encoder uses this interleaved reconstruction to perform encoding of subsequent pictures. For example, if a P picture is to be motion encoded using an interleaved I picture as a reference, the encoder performs the search for an appropriate motion vector in the normal manner using the interleaved I picture. In this manner, the encoder may determine that a block corresponding to the either the left or right view is the best "match" for the current block being encoded in the P picture. Other implementations expand the search window used in finding the best "match" in the reference picture to account for the fact that the interleaving has spread the blocks of the component left and right pictures further apart in the interleaved reference picture.

Figure 5:
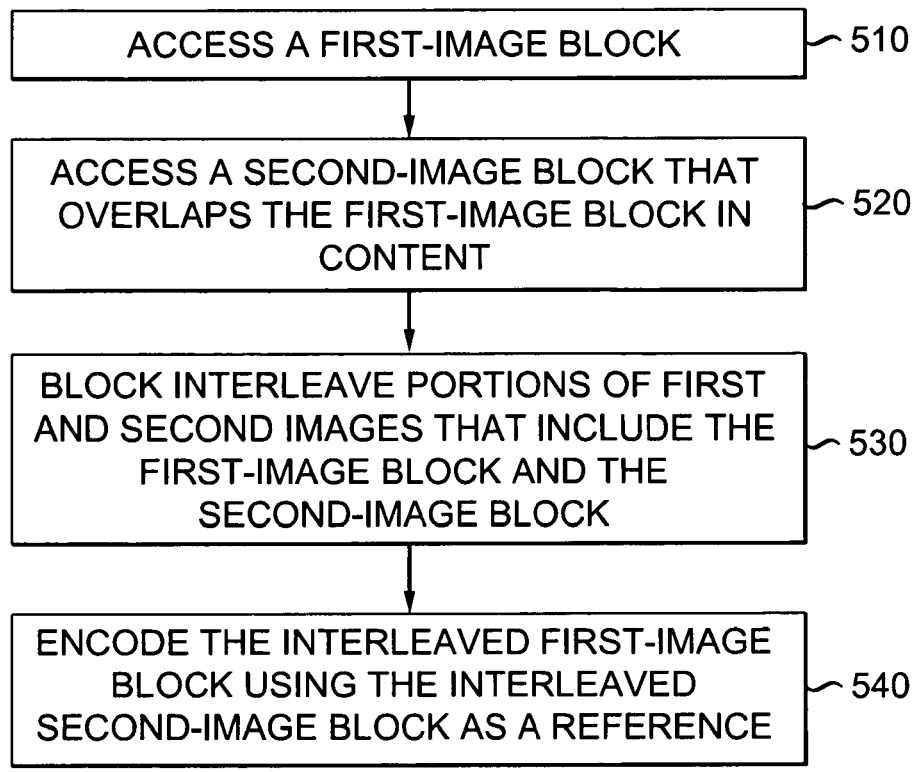
FIG. 5 is a flow diagram depicting an example of an encoding process that may be used with one or more implementations.

Referring to FIG. 5, there is shown an implementation for use in encoding two images. FIG. 5 depicts a process 500 for use in encoding two images, or portions thereof.

The process 500 includes accessing a first-image block (510). The first image may be, for example, the sampled left view picture 148 of FIG. 1, and the first-image block may be, for example, the top left block from the sampled left view picture 148.

The process 500 includes accessing a second-image block that overlaps the first-image block in content (520). The second-image may be, for example, the sampled right view picture 150 of FIG. 1. Both the sampled left view picture 148 and the sampled right view picture 150 are generated from a stereo-image pair, and so are assumed to overlap in content. The second-image block may be, for example, the top left block from the sampled right view picture 150.

If the disparity for the top left block of the sampled left view picture 148 is greater than the horizontal block size of the top left block, it is possible that the content does not overlap the content of the top left block of the sampled right view picture 150. As mentioned above, content may overlap, for example, when the two blocks include a common feature, even if the feature is not aligned in the same relative location in each of the two blocks. Such overlap typically occurs in stereo-image pairs, as well as in the separate views of a multi-view system. Content may also overlap regardless of whether one of the images is flipped, rotated, filtered, or otherwise processed.

The process 500 includes block interleaving a portion from the first image that includes the first-image block, and a portion from the second image that includes the second-image block (530). The two portions may include the entire first and second images. Alternatively, the two portions may include less than all of the first and second images. The block interleaving may be, for example, as described above for forming the composite picture 152 of FIG. 1.

The process 500 includes encoding the interleaved first-image block using the interleaved second-image block as a reference (540). The encoding may be performed, for example, as described above for using the encoder 154 of FIG. 1 to encode blocks from the composite picture 152. For example, assuming column-wise interleaving, encoding block G of FIG. 1B using block A as a predictor (that is, as a reference) will result in a first-image block (block G) being encoded using a second-image block (block A) as a reference.

Figure 6:
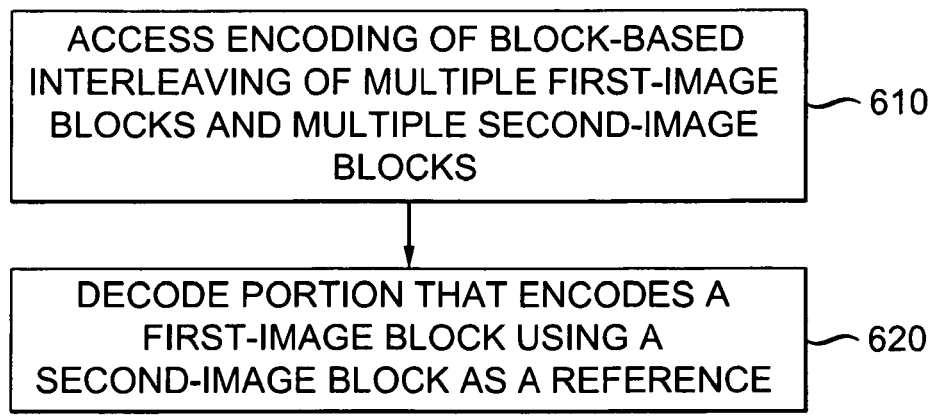
FIG. 6 is a flow diagram depicting an example of a decoding process that may be used with one or more implementations.

Referring to FIG. 6, there is shown an implementation for use in decoding two images. FIG. 6 depicts a process 600 for use in decoding two images, or portions thereof.

The process 600 includes accessing an encoding of an image (610). The image is an interleaved image in which two images have been interleaved on a block basis. The two images are a first image that includes multiple first-image blocks, and a second image that includes multiple second-image blocks. The encoding may be, for example, the received picture that is received and decoded by the decoding block 120 of FIG. 1 discussed above.

The process 600 includes decoding a portion of the accessed encoding (620). The portion includes an encoding of a first-image block that has been encoded using a second-image block as a reference. The first-image block may be, as suggested above, the top left block from the sampled left view picture 148. The second-image block may be, as suggested above, the top left block from the sampled right view picture 150, which is assumed in this discussion to have overlapping content with the top left block from the sampled left view picture 148. The decoding may be performed by, for example, the H.264 decoder 170 of FIG. 1 discussed above.

Figure 7:
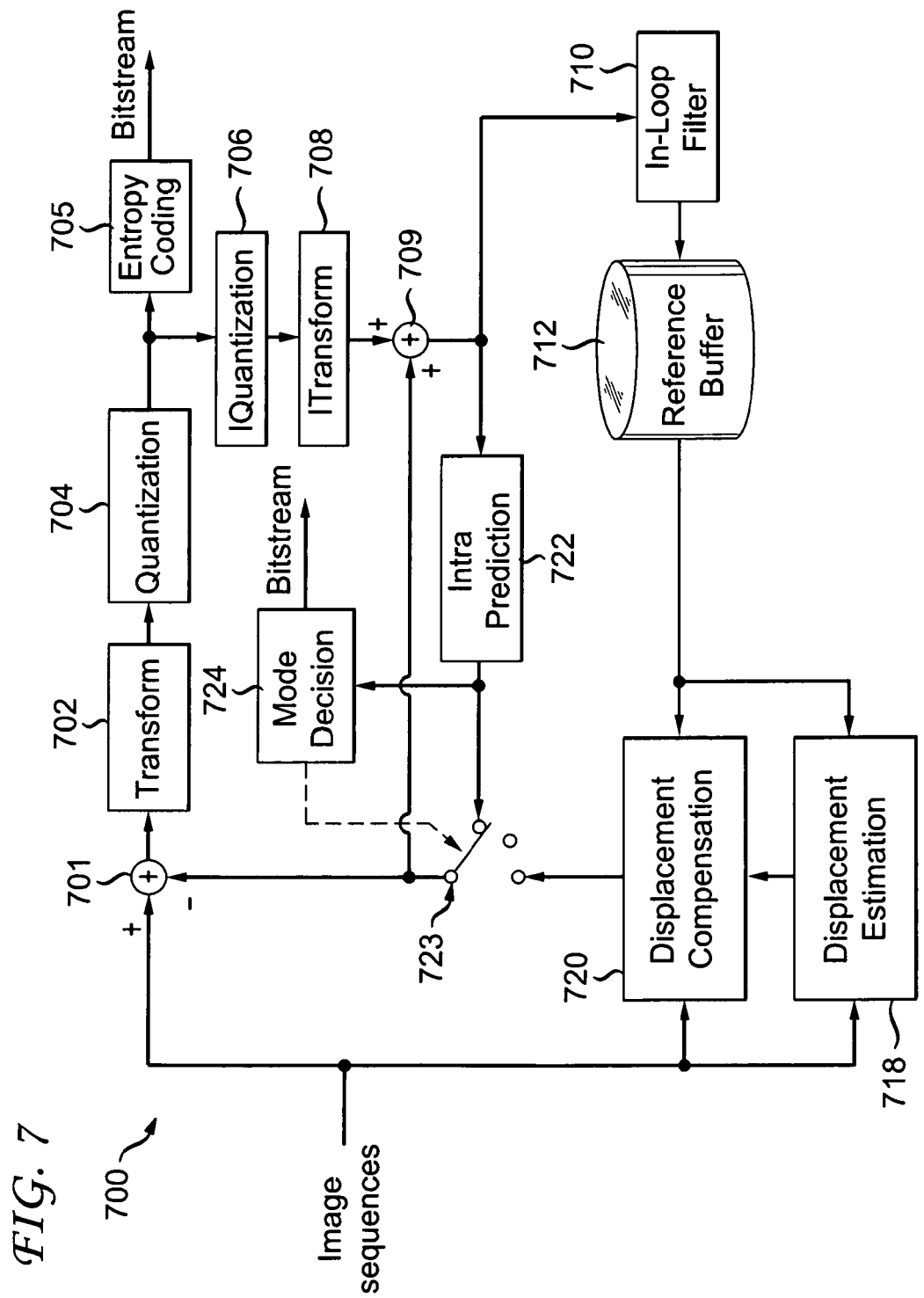
FIG. 7 is a block/flow diagram depicting an example of an encoding system that may be used with one or more implementations.

Referring to FIG. 7, an encoder 700 depicts an implementation of an encoder that may be used to encode images such as, for example, video images or depth images. In one implementation, the encoder 700 is used as the encoder 154 in the system 100 of FIG. 1. The encoder 700 may also be used to encode data, such as, for example, metadata providing information about the encoded bitstream. The encoder 700 may be implemented as part of, for example, a video transmission system as described below with respect to FIG. 9. It should also be clear that the blocks of FIG. 7 provide a flow diagram of an encoding process, in addition to providing a block diagram of an encoder.

An input image sequence arrives at an adder 701 as well as at a displacement compensation block 720 and a displacement estimation block 718. Note that displacement refers, for example, to either motion or disparity. Another input to the adder 701 is one of a variety of possible reference picture information received through a switch 723.

For example, if a mode decision module 724 in signal communication with the switch 723 determines that the encoding mode should be intra-prediction with reference to a block from the same picture currently being encoded, then the adder 701 receives its input from an intra-prediction module 722. Alternatively, if the mode decision module 724 determines that the encoding mode should be displacement compensation and estimation with reference to a picture that is different from the picture currently being encoded, then the adder 701 receives its input from the displacement compensation module 720.

In various implementations, the intra-prediction module 722 provides a predetermined predictor based on one or more blocks that are neighboring blocks to a block being encoded. Such neighboring blocks may be interleaved blocks from another input image, such as, for example, a picture that forms a stereo-image pair with the picture being encoded. In various implementations, the interleaving is based on (x,y) coordinates, such that the blocks are interleaved in the order in which they appear in the constituent pictures. However, in other implementations the interleaving is based on disparity, such that blocks that correspond in content are interleaved adjacent to each other to the extent possible, regardless of where those blocks are located in their constituent pictures.

One particular implementation provides a practical use of this concept by coding a single value specifying the integer number of blocks of shift between the left and right pictures before interleaving. This allows an average disparity measurement at the encoder to guide the interleaving, and costs very little to code in the stream, and allows an easy descrambling of the blocks at the decoder prior to display.

In various implementations, the intra-prediction module 722 provides a predictor (a reference) by searching within the picture being encoded for the best reference block. More specifically, several such implementations search within a reconstruction of those portions of the current picture that have already been encoded. In some implementations, the searching is restricted to blocks that lie on the existing block boundaries. However, in other implementations, the searching is allowed to search blocks regardless of whether those blocks cross existing block boundaries. Because of the searching, such implementations are often more time-intensive and processor-intensive than merely using predetermined neighboring blocks as the references. However, such implementations typically offer the advantage of finding a better prediction of a given block. Such implementations also typically offer the advantage of finding a corresponding stereo-image block, or corresponding multi-view-image block, without needing to know the disparity.

Such implementations may lead to a best estimate Intra prediction block. Additionally, in various implementations, the boundaries of the reference block can lie on a sub-pixel boundary, and recovery of the reference involves an interpolation step to restore the actual block to be used as reference during decoding. Depending on the content of the pictures, such sub-pixel interpolation implementations may improve compression efficiency compared to the use of neighboring blocks as references.

The adder 701 provides a signal to a transform module 702, which is configured to transform its input signal and provide the transformed signal to a quantization module 704. The quantization module 704 is configured to perform quantization on its received signal and output the quantized information to an entropy encoder 705. The entropy encoder 705 is configured to perform entropy encoding on its input signal to generate a bitstream. An inverse quantization module 706 is configured to receive the quantized signal from quantization module 704 and perform inverse quantization on the quantized signal. In turn, an inverse transform module 708 is configured to receive the inverse quantized signal from the inverse quantization module 706 and perform an inverse transform on its received signal. The output of the inverse transform module 708 is a reconstruction of the signal that is output from the adder 701.

An adder (more generally referred to as a combiner) 709 adds (combines) signals received from the inverse transform module 708 and the switch 723 and outputs the resulting signal to the intra prediction module 722 and an in-loop filter 710. The resulting signal is a reconstruction of the image sequence signal that is input to the encoder 700.

The intra prediction module 722 performs intra-prediction, as discussed above, using its received signals. Similarly, the in-loop filter 710 filters the signals received from the adder 709 and provides filtered signals to a reference buffer 712. The reference buffer 712 provides image information to the displacement estimation and compensation modules 718 and 720.

Metadata may be added to the encoder 700 as encoded metadata and combined with the output bitstream from the entropy coder 705. Alternatively, for example, unencoded metadata may be input to the entropy coder 705 for entropy encoding along with the quantized image sequences.

Data is also provided to the output bitstream by the mode decision module 724. The mode decision module 724 provides information to the bitstream that indicates the mode used to encode a given block. Such information often includes an indication of the location of the reference block. For example, in various implementations that use intra-prediction and that perform a search of the current picture to find a reference block, the mode decision module 724 indicates the location of the reference using a disparity vector. The disparity vector information may be provided to the mode decision module 724 by the intra prediction module 722.

As further described below, the disparity vector information may be differentially coded using the disparity vector of a neighboring macroblock as a reference. In addition, disparity vectors for a picture may be grouped and additionally encoded to remove entropy since there is likely to be spatial similarity in disparity vectors.

Figure 8:
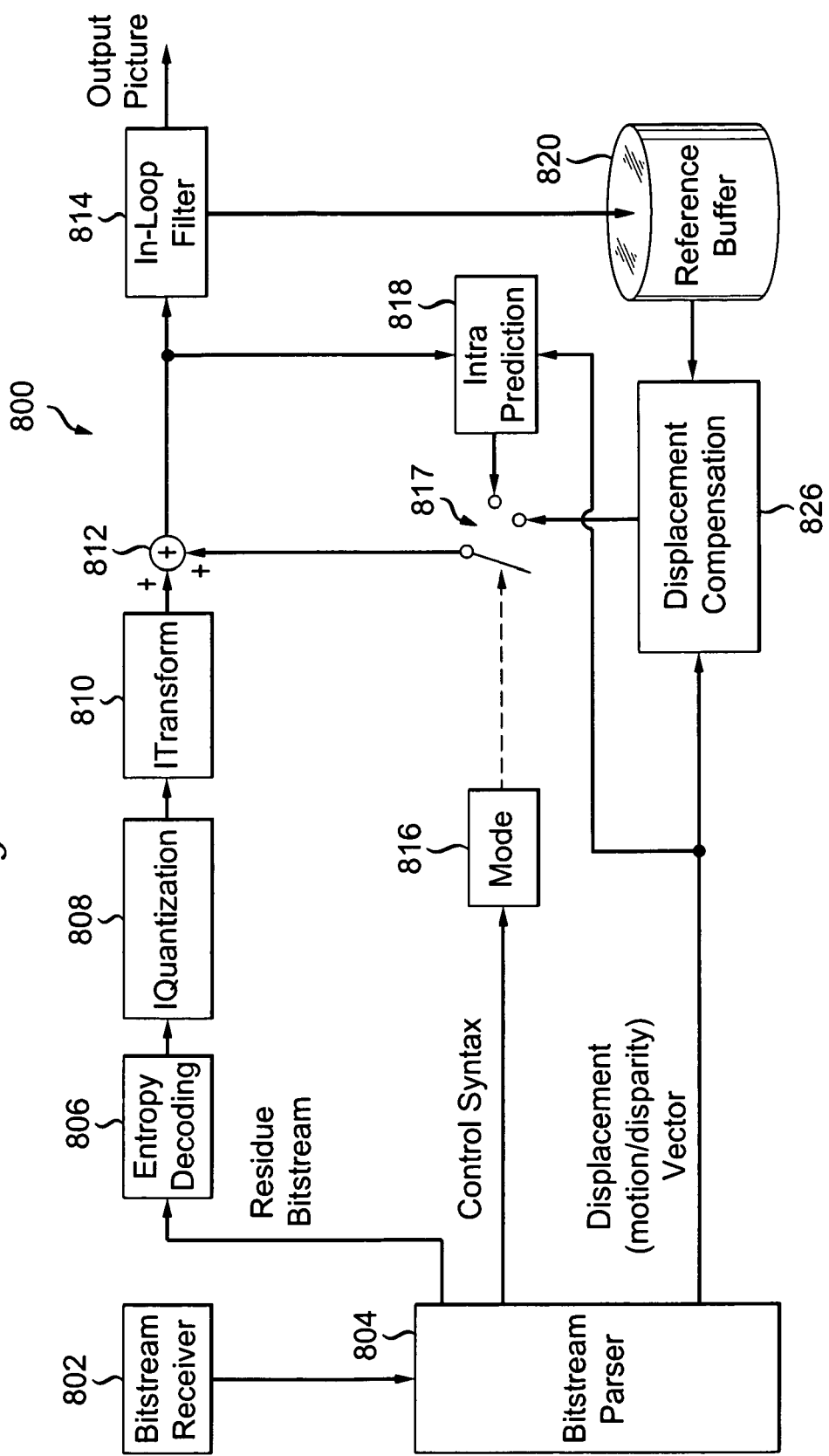
FIG. 8 is a block/flow diagram depicting an example of a decoding system that may be used with one or more implementations.

Referring to FIG. 8, a decoder 800 depicts an implementation of a decoder that may be used to decode images and provide them to, for example, a display device. The decoder 800 may also be used to decode, for example, metadata providing information about the decoded bitstream. In one implementation, the decoder 800 is used as the decoder 156 and/or the decoder 170 in the system 100 of FIG. 1. Further, the decoder 800 may be implemented as part of, for example, a video receiving system as described below with respect to FIG. 10. It should also be clear that the blocks of FIG. 8 provide a flow diagram of a decoding process, in addition to providing a block diagram of a decoder.

The decoder 800 is configured to receive a bitstream using a bitstream receiver 802. The bitstream receiver 802 is in signal communication with a bitstream parser 804 and provides the bitstream to the bitstream parser 804.

The bitstream parser 804 is configured to transmit a residue bitstream to an entropy decoder 806, to transmit control syntax elements to a mode selection module 816, and to transmit displacement (motion/disparity) vector information to a displacement compensation module 826 and to an intra prediction module 818.

The displacement vector information may be, for example, motion vector information or disparity vector information. Motion vector information is typically used in inter-prediction to indicate relative motion from a previous image. Disparity vector information is typically used in either (i) inter-prediction to indicate disparity with respect to a separate image or (ii) intra-prediction to indicate disparity with respect to a portion of the same image. As is known in the art, disparity typically indicates the relative offset, or displacement, between two images. Disparity may also be used to indicate the relative offset, or displacement, between two portions of an image.

An inverse quantization module 808 performs inverse quantization on an entropy decoded signal received from the entropy decoder 806. In addition, an inverse transform module 810 is configured to perform an inverse transform on an inverse quantized signal received from the inverse quantization module 808 and to output the inverse transformed signal to an adder (also referred to as a combiner) 812.

The adder 812 can receive one of a variety of other signals depending on the decoding mode employed. For example, the mode decision module 816 can determine whether displacement compensation or intra prediction encoding was performed on the currently processed block by the encoder by parsing and analyzing the control syntax elements. Depending on the determined mode, the mode selection control module 816 can access and control a switch 817, based on the control syntax elements, so that the adder 812 can receive signals from the displacement compensation module 826 or the intra prediction module 818.

Here, the intra prediction module 818 is configured to perform intra prediction to decode a block using references to the same picture currently being decoded. In turn, the displacement compensation module 826 is configured to perform displacement compensation to decode a block using references to a block of another previously processed picture that is different from the picture currently being decoded.

Additionally, the intra prediction module 818 of various implementations receives disparity vector information from the bitstream parser 804 identifying the location of the reference block used in intra-prediction. In such implementations, the block has typically been encoded in an intra-coding mode that searches the picture being coded to find a reference. This is in contrast, for example, to using one or more predetermined blocks from the picture being encoded to generate a predictor.

After receiving prediction or compensation information signals, the adder 812 adds the prediction or compensation information signals with the inverse transformed signal for transmission to an in-loop filter 814, such as, for example, a deblocking filter that filters out blocking artifacts. The adder 812 also outputs the added signal to the intra prediction module 818 for use in intra prediction.

The in-loop filter 814 is configured to filter its input signal and output decoded pictures. Further, the in-loop filter 814 provides the filtered signal to a reference buffer 820. The reference buffer 820 is configured to parse its received signal to permit and aid in displacement compensation decoding by the displacement compensation module 826, to which the reference buffer 820 provides parsed signals. Such parsed signals may be, for example, all or part of various pictures that may have been used as a reference.

Metadata may be included in a bitstream provided to the bitstream receiver 802. The metadata may be parsed by the bitstream parser 804, and decoded by the entropy decoder 806. The decoded metadata may be extracted from the decoder 800 after the entropy decoding using an output (not shown).

Figure 9:
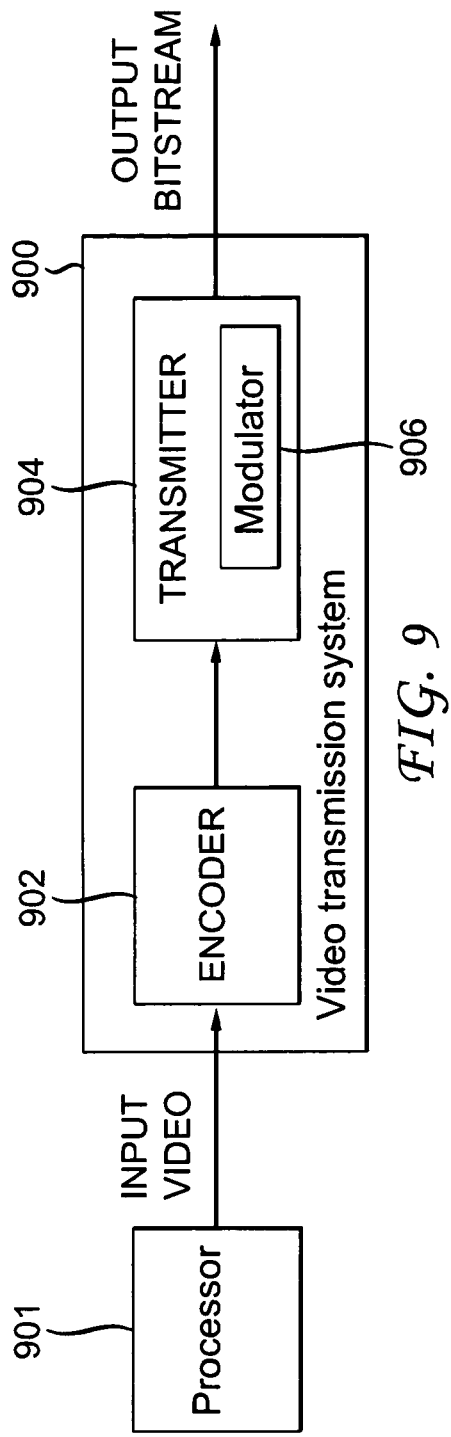
FIG. 9 is a block/flow diagram depicting an example of a video transmission system that may be used with one or more implementations.

Referring now to FIG. 9, a video transmission system/apparatus 900 is shown, to which the features and principles described above may be applied. The video transmission system 900 may be, for example, a head-end or transmission system for transmitting a signal using any of a variety of media, such as, for example, satellite, cable, telephone-line, or terrestrial broadcast. The transmission may be provided over the Internet or some other network. The video transmission system 900 is capable of generating and delivering, for example, video content and other content such as, for example, indicators of depth including, for example, depth and/or disparity values. It should also be clear that the blocks of FIG. 9 provide a flow diagram of a video transmission process, in addition to providing a block diagram of a video transmission system/apparatus.

The video transmission system 900 receives input video from a processing device 901. In one implementation, the processing device 901 simply provides original-sized images, such as the left view picture 140 and the right view picture 142, to the video transmission system 900. However, in another implementation, the processing device 901 is a processor configured for performing down-sampling and interleaving as described above for the system 100 with respect to the operations of the sampler 144 and the sampler 146 as well as the interleaving that results in the composite picture 152. Various implementations of the processing device 901 include, for example, processing devices implementing the operations 510, 520, and 530 of the process 500 of FIG. 5. The processing device 901 may also provide metadata to the video transmission system 900 indicating whether the input picture is interleaved and/or providing various parameters describing the interleaving. Such parameters include, for example, number of interleaved pictures, conversion rate for each picture, conversion type (for example, horizontal sampling or vertical sampling) for each picture, or interleaving mode (for example, row-wise interleaving or column-wise interleaving).

The video transmission system 900 includes an encoder 902 and a transmitter 904 capable of transmitting the encoded signal. The encoder 902 receives video information from the processor 901. The video information may include, for example, images and depth indicators. The encoder 902 generates an encoded signal(s) based on the video information. The encoder 902 may be, for example, the encoding block 110, the encoder 154, or the encoder 700. The encoder 902 may include sub-modules, including for example an assembly unit for receiving and assembling various pieces of information into a structured format for storage or transmission. The various pieces of information may include, for example, coded or uncoded video, coded or uncoded depth indicators and/or information, and coded or uncoded elements such as, for example, motion vectors, coding mode indicators, and syntax elements. In some implementations, the encoder 902 includes the processor 901 and therefore performs the operations of the processor 901.

The transmitter 904 receives the encoded signal(s) from the encoder 902 and transmits the encoded signal(s) in one or more output bitstreams. The transmitter 904 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 906. The transmitter 904 may include, or interface with, an antenna (not shown). Further, implementations of the transmitter 904 may be limited to the modulator 906.

Figure 10:
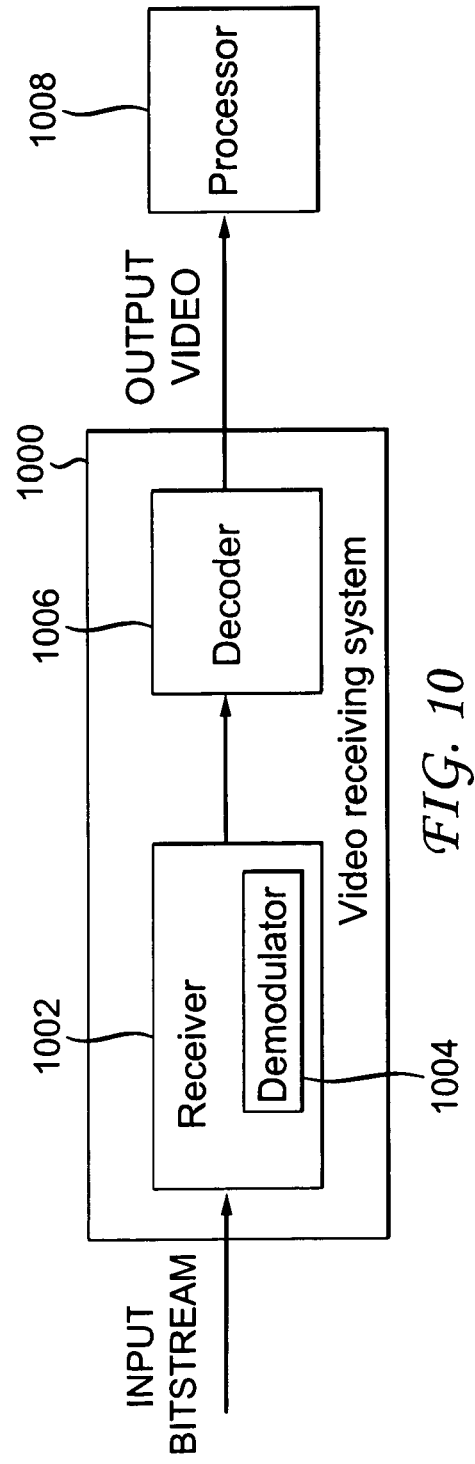
FIG. 10 is a block/flow diagram depicting an example of a video receiving system that may be used with one or more implementations.

Referring now to FIG. 10, a video receiving system/apparatus 1000 is shown to which the features and principles described above may be applied. The video receiving system 1000 may be configured to receive signals over a variety of media, such as, for example, satellite, cable, telephone-line, or terrestrial broadcast. The signals may be received over the Internet or some other network. It should also be clear that the blocks of FIG. 10 provide a flow diagram of a video receiving process, in addition to providing a block diagram of a video receiving system/apparatus.

The video receiving system 1000 may be, for example, a cell-phone, a computer, a set-top box, a television, or other device that receives encoded video and provides, for example, decoded video for display to a user, for processing, or for storage. Thus, the video receiving system 1000 may provide its output to, for example, a screen of a television, a computer monitor, a computer (for storage, processing, or display), or some other storage, processing, or display device.

The video receiving system 1000 is capable of receiving and processing video content including video information. The video receiving system 1000 includes a receiver 1002 for receiving an encoded signal, such as for example the signals described in the implementations of this application. The receiver 1002 may receive, for example, a signal providing the received picture to the decoding block 120 of FIG. 1, a signal carrying the bitstream from the encoder 700 of FIG. 7, or a signal output from the video transmission system 900 of FIG. 9.

The receiver 1002 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1004, de-randomizing the energy in the signal, de-interleaving the data in the signal, and error-correction decoding the signal. The receiver 1002 may include, or interface with, an antenna (not shown). Implementations of the receiver 1002 may be limited to the demodulator 1004.

The video receiving system 1000 includes a decoder 1006. The receiver 1002 provides a received signal to the decoder 1006. The decoder 1006 outputs a decoded signal, such as, for example, decoded video signals including video information. The decoder 1006 may be, for example, the decoder 156 or the decoder 170 of the system 100 of FIG. 1, or the decoder 800 of FIG. 8.

The output video from the decoder 1006 is provided, in one implementation, to a processing device 1008. The processing device 1008 is, in one implementation, a processor configured for performing deinterleaving and up-sampling as described above for the system 100 with respect to the deinterleaving that results in the horizontal split screen picture 174 as well as the operations of the sampler 180 and the sampler 182. In some implementations, the decoder 1006 includes the processor 1008 and therefore performs the operations of the processor 1008. In other implementations, the processor 1008 is part of a downstream device such as, for example, a set-top box or a television.

We thus provide one or more implementations having particular features and aspects. However, features and aspects of described implementations may also be adapted for other implementations.

For example, the above features, aspects, and implementations may be applied or adapted to other systems that are not restricted to left/right stereo systems. One such implementation interleaves a video picture and its corresponding depth picture. Another such implementation interleaves two or more different views from a multi-view system that are not necessarily related as left and right views.

As another example, the above implementations generally describe interleaving at a macroblock level. However, interleaving is performed at other levels in other implementations. Such other levels include, for example, a field level, a slice level, and a partition level.

As yet another example, these implementations and features may be used in the context of coding video and/or coding other types of data. Additionally, these implementations and features may be used in the context of, or adapted for use in the context of, a standard. Such standards include, for example, AVC, the extension of AVC for multi-view coding (MVC), the extension of AVC for scalable video coding (SVC), and any proposed MPEG/JVT standards for 3-D Video coding (3DV) and for High-Performance Video Coding (HVC), but other standards (existing or future) may be used. Of course, the implementations and features need not be used in a standard.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, a disparity map for a 2D video picture, a depth map that corresponds to a 2D video picture, or an edge map.

Additionally, this application or its claims may refer to "determining" various pieces of information. Determining the information may include one or more of, for example, estimating the information, calculating the information, predicting the information, identifying the information, or retrieving the information from memory.

It is to be appreciated that the use of any of the following "/", "and/or", and "at least one of", for example, in the cases of "A/B", "A and/or B" and "at least one of A and B", is intended to encompass the selection of the first listed option (A) without the second listed option (B), or the selection of the second listed option (B) without the first listed option (A), or the selection of both options (A and B). As a further example, in the cases of "A, B, and/or C" and "at least one of A, B, and C" and "at least one of A, B, or C", such phrasing is intended to encompass the selection of the first listed option (A) without the second (B) and third (C) listed options, or the selection of the second listed option (B) without the selection of the first (A) and third (C) listed options, or the selection of the third listed option (C) without the selection of the first (A) and second (B) listed options, or the selection of the first and the second listed options (A and B) without the selection of the third listed option (C), or the selection of the first and third listed options (A and C) without the selection of the second listed option (B), or the selection of the second and third listed options (B and C) without the selection of the first listed option (A), or the selection of all three options (A and B and C). This may be extended, as will be readily apparent to one of ordinary skill in this and related arts, for lists of any size. Note that none of the phrasing discussed in this paragraph is intended to limit the selection so as not to include elements that are not listed. For example, "A and/or B" does not preclude the selection of "A" and "C".

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment. Additionally, these phrases (for example, "in one embodiment") are not intended to indicate that there is only one possible embodiment but rather to draw attention to the fact that a particular embodiment is being discussed.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and/or firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users or devices.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:

1. A method comprising:
accessing a first image that includes multiple blocks, the multiple blocks of the first image including a first-image block,
wherein the first-image block is a macroblock;
accessing a second image that includes multiple blocks, the multiple blocks of the second image including a second-image block that has overlapping content with the first-image block,
wherein the first image and the second image are stereo image pairs;
interleaving the multiple blocks of the first image and the multiple blocks of the second image on a block basis to form an interleaved image,
the interleaved image being a composite image of the first image and the second image;
encoding at least a portion of the interleaved image by encoding the first-image block using the second-image block as a reference,
wherein encoding the first-image block comprises identifying the second-image block based on a value of disparity for the first-image block; and
providing the encoded first-image block for transmission or storage.

2. The method of claim 1 wherein the encoding comprises H.264 encoding using an intra-coding mode of H.264.

3. The method of claim 1 wherein interleaving comprises interleaving blocks based on relative positions in the first image and the second image.

4. The method of claim 1 wherein interleaving comprises interleaving blocks based on a value of disparity for the multiple blocks in the first image.

5. The method of claim 1 wherein the first-image block and the second-image block are neighbor blocks in the interleaved image.

6. A processor readable medium having stored thereon instructions that cause one or more processors to collectively:
- access a first image that includes multiple blocks, the multiple blocks of the first image including a first-image block,
- wherein the first-image block is a macroblock;
- access a second image that includes multiple blocks, the multiple blocks of the second image including a second-image block that has overlapping content with the first-image block,
- wherein the first image and the second image are stereo Image pairs;
- interleave the multiple blocks of the first image and the multiple blocks of the second image on a block basis to form an interleaved image,
  - the interleaved image being a composite image of the first image and the second image;
- encode at least a portion of the interleaved image by encoding the first-image block using the second-image block as a reference,
- wherein encoding the first-image block comprises identifying the second-image block based on a value of disparity for the first-image block; and
- provide the encoded first-image block for transmission or storage.

7. An apparatus comprising:
- one or more processors collectively configured to:
- access a first image that includes multiple blocks, the multiple blocks of the first image including a first-image block,
- wherein the first-image block is a macroblock,
- access a second image that includes multiple blocks, the multiple blocks of the second image including a second-image block that has overlapping content with the first-image block,
- wherein the first image and the second image are stereo image pairs, and
- interleave the multiple blocks of the first image and the multiple blocks of the second image on a block basis to form an interleaved image,
- the interleaved image being a composite image of the first image and the second image; and
- an encoder to encode at least a portion of the interleaved image by encoding the first-image block using the second-image block as a reference,
- wherein encoding the first-image block comprises identifying the second-image block based on a value of disparity for the first-image block, and
- provide the encoded first-image block for transmission or storage.

8. A method comprising:
- accessing an encoded image, the encoded image being an encoding of a block-based interleaving of multiple blocks of a first image and multiple blocks of a second image,
- the multiple blocks of the first image including a first-image block that is a macroblock, and
- the multiple blocks of the second image including a second-image block that has overlapping content with the first-image block,
- wherein the first image and the second image are stereo image pairs;
- decoding a portion of the encoded image that encodes the first-image block using the second-image block as a reference,
- wherein decoding the first-image block comprises identifying the second-image block based on a value of disparity for the first-image block;
- and providing the decoded portion for processing or display.

9. The method of claim 8 further comprising:
- decoding the encoded image to produce a decoded image that includes the decoded portion; and deinterleaving the decoded image to produce a deinterleaved image including at least a reconstruction of the first image and a reconstruction of the second image.

10. The method of claim 8 wherein the decoding comprises H.264 decoding using an intra-coding mode of H.264.

11. The method of claim 8 wherein the block-based interleaving comprises an interleaving of blocks based on relative positions in the first image and the second image.

12. The method of claim 8 wherein the block-based interleaving comprises interleaving blocks based on a value of disparity for the multiple blocks in the first image.

13. The method of claim 8 wherein the first-image block and the second-image block are neighbor blocks in an interleaved image, the interleaved image being a composite image of the first image and the second image.

14. A processor readable medium having stored thereon instructions that cause one or more processors to collectively:
- access an encoded image, the encoded image being an encoding of a block-based interleaving of multiple blocks of a first image and multiple blocks of a second image,
- the multiple blocks of the first image including a first-image block that is a macroblock, and
- the multiple blocks of the second image including a second-image block that has overlapping content with the first-image block,
- wherein the first image and the second image are stereo image pairs,
- decode a portion of the encoded image that encodes the first-image block using the second-image block as a reference,
- wherein decoding the first-image block comprises identifying the second-image block based on a value of disparity for the first-image block,
- and provide the decoded portion for processing or display.

15. An apparatus comprising a decoder configured to perform:
- accessing an encoded image, the encoded image being an encoding of a block-based interleaving of multiple blocks of a first image and multiple blocks of a second image,
- the multiple blocks of the first image including a first-image block that is a macroblock, and the multiple blocks of the second image including a second-image block that has overlapping content with the first-image block,
- wherein the first image and the second image are stereo image pairs,
- decoding a portion of the encoded image that encodes the first-image block using the second-image block as a reference,
- wherein decoding the first-image block comprises identifying the second-image block based on a value of disparity for the first-image block, and providing the decoded portion for processing or display.

16. The apparatus of claim 15 wherein the decoder is part of an encoder.

17. The method of claim 1 wherein interleaving comprises: determining that the first-image block and the second-image block correspond to each other based on disparity; and interleaving the first-image block and the second-image block so that they are neighbors in the interleaved image.

18. The method of claim 8 wherein interleaving comprises: determining that the first-image block and the second-image block correspond to each other based on disparity; and interleaving the first-image block and the second-image block so that they are neighbors in the interleaved image.

19. The processor readable medium of claim 6 wherein the encoding comprises H.264 encoding using an intra-coding mode of H.264.

20. The processor readable medium of claim 6 wherein blocks are interleaved based on relative positions in the first image and the second image.

21. The processor readable medium of claim 6 wherein blocks are interleaved based on a value of disparity for the multiple blocks in the first image.

22. The processor readable medium of claim 6 wherein the first-image block and the second-image block are neighbor blocks in the interleaved image.

23. The processor readable medium of claim 6 wherein blocks are interleaved by: determining that the first-image block and the second-image block correspond to each other based on disparity; and interleaving the first-image block and the second-image block so that they are neighbors in the interleaved image.

24. The apparatus of claim 7 wherein the encoding comprises H.264 encoding using an intra-coding mode of H.264.

25. The apparatus of claim 7 wherein blocks are interleaved based on relative positions in the first image and the second image.

26. The apparatus of claim 7 wherein blocks are interleaved based on a value of disparity for the multiple blocks in the first image.

27. The apparatus of claim 7 wherein the first-image block and the second-image block are neighbor blocks in the interleaved image.

28. The apparatus of claim 7 wherein blocks are interleaved by: determining that the first-image block and the second-image block correspond to each other based on disparity; and interleaving the first-image block and the second-image block so that they are neighbors in the interleaved image.

29. The processor readable medium of claim 14 further comprising instructions that cause one or more processors to collectively: decode the encoded image to produce a decoded image that includes the decoded portion; and deinterleave the decoded image to produce a deinterleaved image including at least a reconstruction of the first image and a reconstruction of the second image.

30. The processor readable medium of claim 14 wherein the portion of the encoded image is decoded by H.264 decoding using an intra-coding mode of H.264.

31. The processor readable medium of claim 14 wherein the block-based interleaving comprises an interleaving of blocks based on relative positions in the first image and the second image.

32. The processor readable medium of claim 14 wherein the block-based interleaving comprises interleaving blocks based on a value of disparity for the multiple blocks in the first image.

33. The processor readable medium of claim 14 wherein the first-image block and the second-image block are neighbor blocks in an interleaved image, the interleaved image being a composite image of the first image and the second image.

34. The processor readable medium of claim 14 wherein the interleaving comprises: determining that the first-image block and the second-image block correspond to each other based on disparity; and interleaving the first-image block and the second-image block so that they are neighbors in the interleaved image.

35. The apparatus of claim 15, wherein the decoder is further configured to perform: decoding the encoded image to produce a decoded image that includes the decoded portion; and deinterleaving the decoded image to produce a deinterleaved image including at least a reconstruction of the first image and a reconstruction of the second image.

36. The apparatus of claim 15 wherein the decoding comprises H.264 decoding using an intra-coding mode of H.264.

37. The apparatus of claim 15 wherein the block-based interleaving comprises an interleaving of blocks based on relative positions in the first image and the second image.

38. The apparatus of claim 15 wherein the block-based interleaving comprises interleaving blocks based on a value of disparity for the multiple blocks in the first image.

39. The apparatus of claim 15 wherein the first-image block and the second-image block are neighbor blocks in an interleaved image the interleaved image being a composite image of the first image and the second image.

40. The apparatus of claim 15 wherein interleaving comprises: determining that the first-image block and the second-image block correspond to each other based on disparity; and interleaving the first-image block and the second-image block so that they are neighbors in the interleaved image.

* * * * *